United States Patent [19]

Renggli

[11] Patent Number: 5,437,411
[45] Date of Patent: Aug. 1, 1995

[54] VECTORING EXHAUST NOZZLE FLAP AND SEAL POSITIONING APPARATUS

[75] Inventor: Bernard J. Renggli, Cincinnati, Ohio

[73] Assignee: General Electric Company, Cincinnati, Ohio

[21] Appl. No.: 990,487

[22] Filed: Dec. 14, 1992

[51] Int. Cl.⁶ .............................................. B64C 15/02
[52] U.S. Cl. .................................................. 239/265.39
[58] Field of Search ..................... 239/265.17–265.39; 60/227–232

[56] References Cited

U.S. PATENT DOCUMENTS

| | | |
|---|---|---|
| 4,128,208 | 12/1978 | Ryan et al. |
| 4,641,783 | 2/1987 | Camboulives ............... 239/265.39 |
| 4,994,660 | 2/1991 | Hauer |
| 5,039,014 | 8/1991 | Lippmeier |
| 5,076,496 | 12/1991 | Lippmeier |
| 5,150,839 | 9/1992 | Reedy ............... 239/265.19 X |
| 5,174,502 | 12/1992 | Lippmeier et al. ........ 239/265.19 X |

FOREIGN PATENT DOCUMENTS

WO9203649 3/1992 WIPO.

*Primary Examiner*—Andres Kashnikow
*Assistant Examiner*—Kevin P. Weldon
*Attorney, Agent, or Firm*—Jerome C. Squillaro; David L. Narciso

[57] ABSTRACT

A flap and seal positioning apparatus for centering adjacent longitudinally extending seals and flaps in the divergent section of an aircraft gas turbine engine axisymmetric vectoring nozzle and for equidistantly spacing the flaps during vectoring. The positioning apparatus provides a plurality of pivotably interlinked levers, preferably linked by universal joints, rotatably mounted on and about centering posts extending radially outward from the backs of the divergent flaps and seals. In one embodiment the flap levers have separate arms that are rotatably linked by a double hinge joint at their common centering post such that the arms rotate freely about an axis parallel to the divergent flap. Another embodiment provides the seal lever with a means to translate freely along its axis of rotation coincident with the centering post upon which it is mounted and has a two part centering post with an inner piston that slides within an outer cylinder.

17 Claims, 4 Drawing Sheets

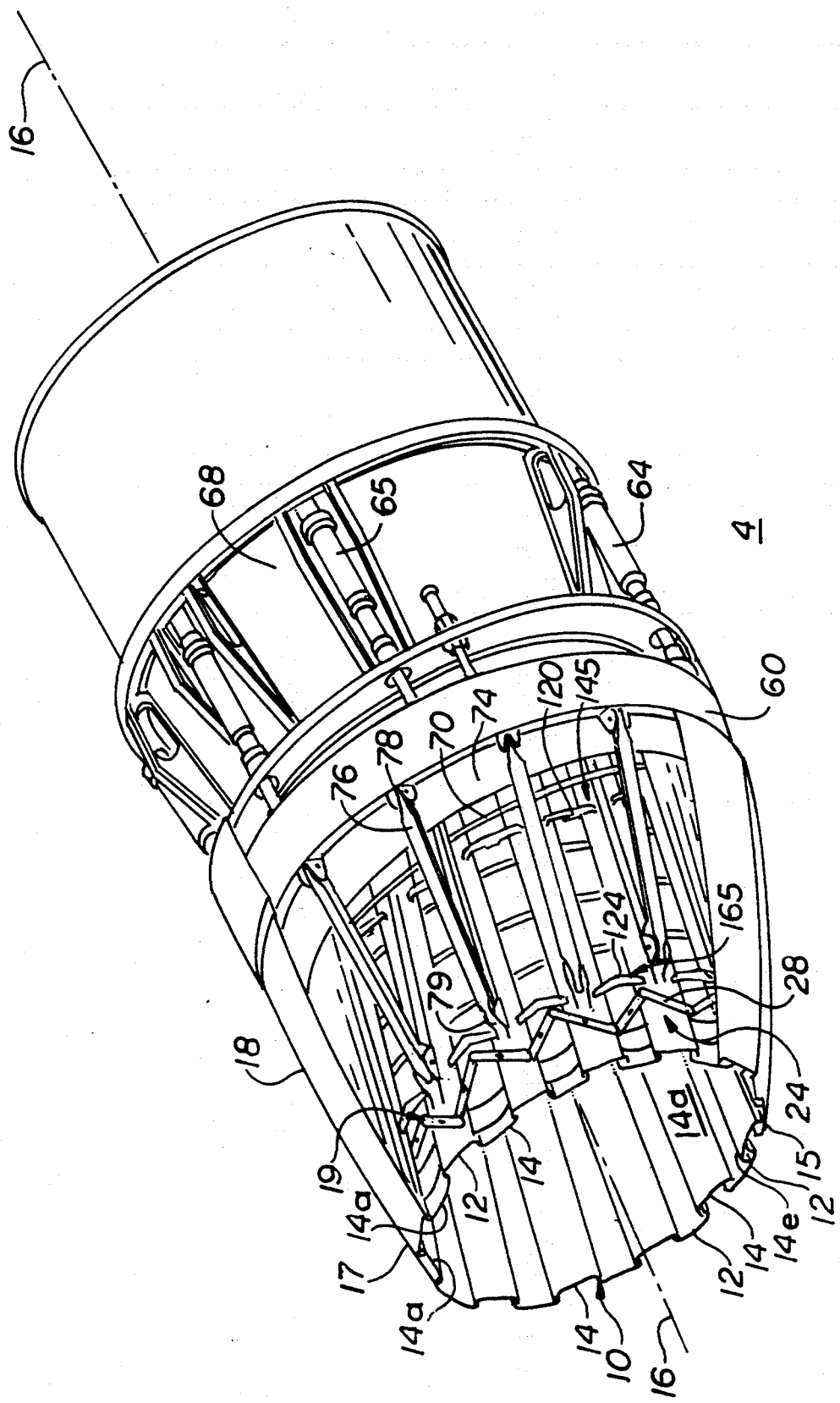

VECTORING EXHAUST NOZZLE FLAP AND SEAL POSITIONING APPARATUS

BACKGROUND OF THE INVENTION

1. Field of the Invention

The present invention relates generally to gas turbine engine axisymmetric vectorable nozzles and, more particularly, to a positioning apparatus for the nozzle's divergent flaps and seals.

2. Discussion of the Background Art

One type of conventional gas turbine engine exhaust nozzle includes primary and secondary exhaust flaps arranged for defining a variable area converging-diverging exhaust nozzle. The exhaust nozzle is axisymmetric, or annular, and exhaust flow is confined by the primary and secondary flaps being positioned circumferentially adjacent to each other, respectively.

The secondary flaps, for example, have a forward end defining a throat of minimum flow area and an aft end having a larger flow area for defining a diverging nozzle extending downstream from the throat. The secondary flaps are variable, which means that the spacing between the secondary flaps as they are moved from a smaller radius position to a larger radius position must necessarily increase. Accordingly, conventional exhaust nozzle flap seals are suitably secured between adjacent ones of the secondary flaps to confine the exhaust flow and prevent leakage of exhaust flow between the secondary flaps.

An advanced axisymmetric vectoring nozzle (AVEN TM nozzle) has been developed and patented in U.S. Pat. No. 4,994,660, entitled "AXISYMMETRICAL VECTORING EXHAUST NOZZLE" by Hauer, assigned to the present assignee, and herein incorporated by reference. An axisymmetric vectoring nozzle provides a means for vectoring the thrust of an axisymmetric convergent/divergent nozzle by universally pivoting the divergent or secondary flaps of the nozzle in an asymmetric fashion or in other words pivoting the secondary flaps in radial and tangential directions with respect to the unvectored nozzle centerline.

Vectoring nozzles, and in particular axisymmetric vectoring exhaust nozzles of the type disclosed in the Hauer reference, provide positionable secondary flaps. These secondary flaps are positionable not only symmetrically, relative to a longitudinal centerline of the exhaust nozzle, but may also are positionable asymmetrically relative thereto for obtaining pitch and yaw vectoring. In such a vectored position, adjacent secondary flaps are positioned askew from each other, and therefore the exhaust nozzle flap seal disposed therebetween must be effective for maintaining sealing also as the secondary flaps are positioned for vectoring.

In the current AVEN TM nozzle the mechanical vector angle is generally limited by the seals bumping on the compression side of the divergent nozzle, where the flaps are angled away from the nozzle's centerline, or the divergent flap and seal unfeathering on the suction side of the divergent nozzle, where the flaps are angled away from the nozzle's centerline. There is a significant amount of vectoring capability which cannot be used because the mechanical limits due to bumping and/or unfeathering are encountered before the AVEN TM nozzle's exit area control actuator stroke limits are reached. The prior art means to avoid damaging the divergent nozzle and the AVEN TM nozzle's mechanical hardware is by limiting the amount of vectoring in the control software.

An alternative means to increase the vectoring angle without exceeding the bump and unfeather limits is to increase exit area to throat area ratio of the nozzle, referred to as A9/A8, where the exit area is as A9 and the throat area is as A8. In general, for a given throat area A8 a maximum vector angle is attainable at a particular A9/A8 which may or may not be optimal at that particular flight condition. This method may be used for small throat areas A8 at which optimal conditions may be available. Otherwise, this increase in A9/A8 area ratio reduces nozzle efficiency, consequently reducing gross thrust, and making the exhaust plume more susceptible to separation from the suction side of the vectored divergent flaps. Again in order to avoid plume separation during vectoring, the prior art nozzle system design uses control logic to attenuate the vector angle as it approaches empirically predetermined plume separation limits. Both of the vectoring angle limiting designs reduces the potential maneuverability and/or performance capability of the engine and aircraft.

There exists a need for a means to increase the vectoring angle limits of an AVEN TM nozzle beyond the prior art mechanical bump and/or unfeather limitations to the fullest extent possible for a given actuator stroke.

SUMMARY OF THE INVENTION

The present invention provides a flap and seal positioning apparatus for centering adjacent longitudinally extending seals and flaps in the divergent section of an aircraft gas turbine engine axisymmetric vectoring nozzle and for equidistantly spacing the flaps during vectoring. The positioning apparatus provides a plurality of pivotably interlinked levers, preferably linked by universal joints, rotatably mounted on and about centering posts extending radially outward from the backs of the divergent flaps and seals. The flap levers have separate arms that are rotatably linked by a double hinge joint at their common centering post such that the arms rotate freely about an axis parallel to the divergent flap. The preferred embodiment further provides for simple compression links between the vectoring ring and the end of the vectorable divergent flaps.

Another embodiment provides the seal lever with a means to translate freely along its axis of rotation coincident with the centering post upon which it is mounted such as by having a two part centering post with an inner piston that slides within an outer cylinder. This allows the use of a straight pivoting flap lever like the seal lever in place of the more complex double hinged flap lever of the first embodiment.

Yet another embodiment provides a ring of centering levers on the compression links, used to vector the flaps, that link together the compression members. This equidistantly spaces the aft end of the compression members and consequently the divergent flaps. A set of conventional centering devices are used to center the divergent seals between the divergent flaps.

The present invention provides advantages over present designs of AVEN TM nozzles by reducing the problems related to adjacent divergent flaps bumping into one and other and becoming unfeathered during vectoring operations. The present invention increases the vectoring angle limits of an AVEN TM nozzle beyond the prior art mechanical bump and/or unfeather limitations to the fullest extent possible for a given actuator stroke. Furthermore, the present invention avoids or reduces the need to limit the vectoring actuators by the use of controls such as the control logic of an engine's electronic controller.

BRIEF DESCRIPTION OF THE DRAWING

The novel features believed characteristic of the present invention are set forth and differentiated in the claims. The invention, together with further objects and advantages thereof, is more particularly described in conjunction with the accompanying drawing in which:

FIG. 1 is a perspective view of an axisymmetric vectoring exhaust nozzle having a positioning apparatus in accordance with one embodiment of the present invention.

FIG. 2b is a side view, aft looking forward, of the positioning apparatus in FIG. 2a.

FIG. 3b is a side view, aft looking forward, of the positioning apparatus in FIG. 3a.

DETAILED DESCRIPTION

Figure 2A:
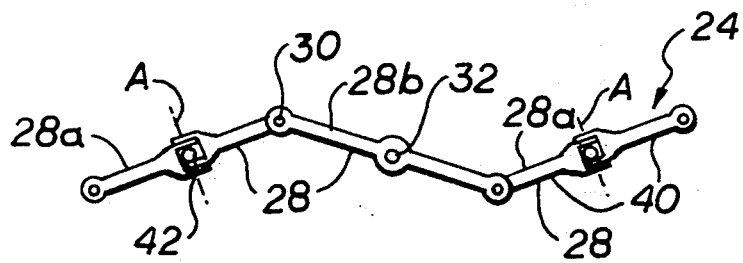
FIG. 2a is an enlarged top schematic view of the positioning apparatus in FIG. 1 with the nozzle opened up to a maximum nozzle exit area.

Illustrated in FIG. 1 is an exemplary embodiment of an axisymmetric, vectorable, variable area exhaust nozzle 4, an AVEN ™ nozzle, for an aircraft gas turbine engine having a divergent flap and seal assembly 10 in a vectored position. The divergent flap and seal assembly 10 has a plurality of alternating divergent flaps 12 and divergent seals 14 disposed in overlapping sealing relationship about a nozzle centerline 16 and is surrounded by an outer flap assembly 18 which provides aerodynamic shielding for the assembly 10. The divergent seals 14 are disposed radially inward of the divergent flaps 12 and designed to seal against the flaps during nozzle operation when the nozzle pressure, the pressure radially inward of the flaps 12 and seals 14, is normally greater than the pressure outside the nozzle.

The AVEN ™ nozzle vectors thrust by positioning the divergent flaps 12 and seals 14 axisymmetrically relative to the centerline 16 therefore the radial and circumferential positions and attitude of the divergent flaps and seals. A vectoring ring 60 is translated and gimballed about nozzle centerline 16 by at least 3 linear actuators 64 which in turn are pivotably mounted to a relatively fixed portion 68 of the nozzle 4 (a second set linear actuators 65 are used to open and close the throat and adjust A9/A8 of the nozzle in a well known conventional manner). Each divergent flap 12 is pivotably mounted by a universal joint, preferably in the form of a ball joint 70, to the downstream end of a corresponding convergent flap 74. The downstream ends of divergent flaps 12 are tied to the vectoring ring 60 by simple compression links 76. Compression link 76 is pivotably mounted to the vectoring ring by a three degree of rotation joint such as a ball joint 78 and to a position on the downstream end of the divergent flap 12 by another ball joint 79. Thrust vectoring is accomplished by gimballing vectoring ring 60 using actuators 64. Actuators 64 are also used to translate vectoring ring 60 to accommodate and/or control the variable exit area to throat area ratio A9/A8.

Adjacent seals 14a on the compression side 15 of the divergent flap and seal assembly 10 are prevented from having their edges 14e bump into each other and the adjacent seals 14a on the suction side 17 of the divergent flap and seal assembly 10 are prevented from unfeathering by a divergent flap and seal positioning means generally shown at 19. Divergent flap and seal positioning means 19 has a chain 24 of pivotably interlinked levers 28.

Referring to FIGS. 2a-2d the chain 24 of pivotably interlinked levers 28 includes flap levers 28a and seal levers 28b and are preferably linked by universal joints 30, such as ball joints illustrated in the FIGS., and rotatably mounted on and about centering posts 32 extending radially outward from divergent flap backs 36 of the divergent flaps 12 and divergent seal backs 38 of the divergent seals 14. The flap levers 28a have separate arms 40 that are rotatably linked by a double hinge joint 42 at their common centering post 32 such that the arms 40 rotate freely about a pivot axis A parallel to the divergent flap 12. As the exhaust nozzle is varied for both vectoring and controlling the ratio of exit area to throat area the levers 28 rotate about their centering posts 32 which are generally perpendicular to flaps 12 and seals 14. The arms 40, on the flap backs 36, further rotate about pivot axis A parallel to the divergent flap 12 thereby equidistancing the flaps 12 and centering the seals 14 while accommodating the change in distance between the centering posts 32 on the divergent flap backs 36 and the divergent seal backs 38 of the divergent seals 14.

A flap to seal retaining means for providing retention between divergent seals 14 and flaps 12 is also provided in the form of a forward retaining means 120 at a forward position 145 of the seal 14 and an aft retaining means 124 at an aft position 165 of the seal 14. The flap to seal retaining means illustrated herein is more fully explained in U.S. Pat. No. 4,994,660, entitled "VECTORING EXHAUST NOZZLE SEAL AND FLAP RETAINING APPARATUS" by Williams et al, assigned to the present assignee, and herein incorporated by reference.

Figure 2B:
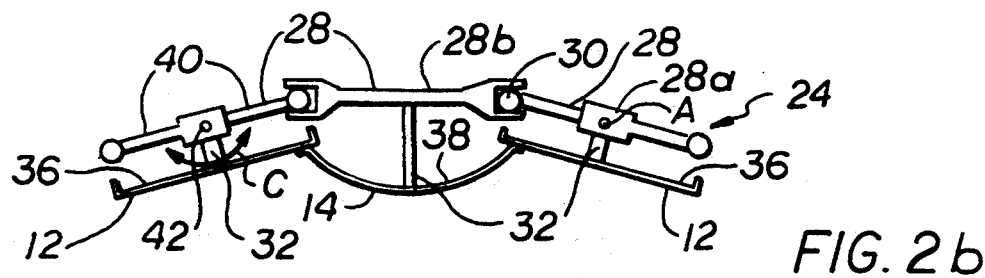
Figure 2C:
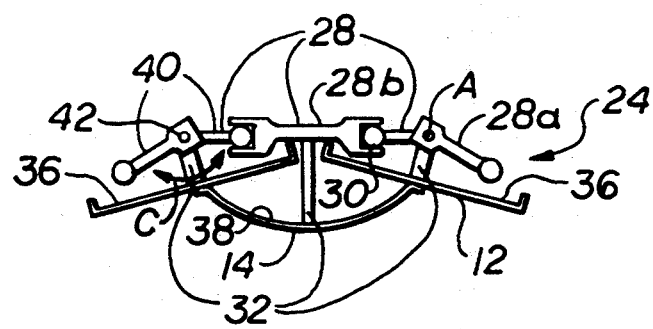
FIG. 2c is a side view, aft looking forward, of the positioning apparatus in FIG. 2d.
Figure 2D:
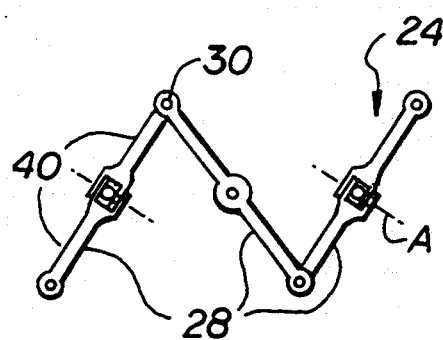
FIG. 2d is an enlarged top schematic view of the positioning apparatus in FIG. 2a with the nozzle closed down to a minimum nozzle exit area.
Figure 3A:
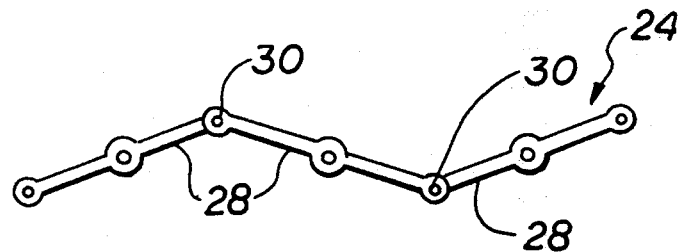
FIG. 3a is an enlarged top schematic view of an alternative embodiment of the positioning apparatus in FIG. 1 with the nozzle opened up to a maximum nozzle exit area.
Figure 3B:
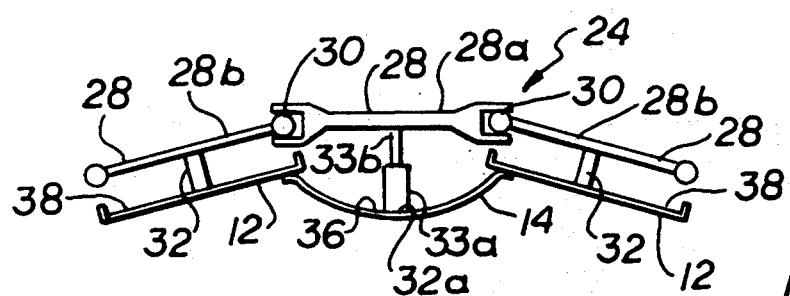
Figure 3C:
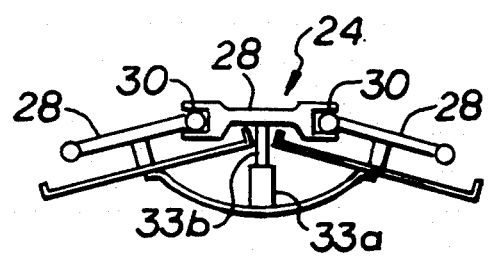
FIG. 3c is an enlarged top schematic view of the positioning apparatus in FIG. 3a with the nozzle closed down to a minimum nozzle exit area.
Figure 3D:
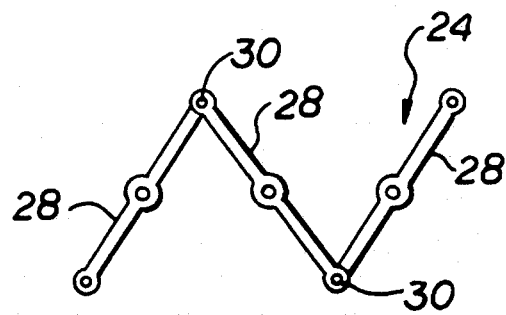
FIG. 3d is a side view, aft looking forward, of the positioning apparatus in FIG. 3c.

FIGS. 2a and 2b illustrate the divergent flap and seal positioning means 19 for maximum A9/A8 or where the divergent flaps 12 are fully spread out. FIGS. 2c and 2d illustrate the divergent flap and seal positioning means 19 for minimum A9/A8 or where the divergent flaps 12 are fully brought in. There occurs differing radial distances from the nozzle centerline to flaps 12 and seals 14 due to vectoring and varying of A9/A8. These radial distances vary circumferentially during vectoring and from position to position as A9/A8 is varied. The difference in radial distances from the nozzle's centerline between the adjacent flaps and seals is accommodated by the arms 40 being rotatably linked by a double hinge joint 42 at their common centering post 32 and therefore being allowed to rotate freely in a generally radial direction about the pivot axis A which is parallel to the divergent flap 12. The arms 40 form an angle C between them that changes as the distance between the flaps is varied.

Another embodiment illustrated in FIGS. 3a–3d provides an alternative means to accommodate the radial differences or changes of the flaps 12 and seals 14. The chain 24 of pivotably interlinked levers 28 includes flap levers 28a and seal levers 28b and are preferably linked by universal joints 30, such as ball joints illustrated in the FIGS., and rotatably mounted on and about centering posts 32 extending radially outward from divergent flap backs 36 of the divergent flaps 12 and divergent seal backs 38 of the divergent seals 14. The flap levers 28a and the seal levers 28b are simple levers and are straight structural members. Flap lever 28a is rotatably mounted about and in radially sliding engagement with its flap centering post 32a such that it is operable to move radially inward and outward with respect to the nozzle centerline. In the embodiment illustrated in FIGS. 3b and 3c the radially sliding engagement is accomplished by having a two piece flap centering post 32a which telescopes and has an outer hollow cylinder 33a fixed to the divergent seal back 38 and an inner piston 33b which is slidably received within the cylinder 33a and fixed to the flap lever 28a. As the exhaust nozzle is varied for both vectoring and controlling the ratio of exit area to throat area the levers 28 rotate about their centering posts 32 which are generally perpendicular to flaps 12 and seals 14. The flap levers 28a slide radially on the inner piston 33b which is slidably received within the cylinder 33a and rotate about the flap centering post 32a thereby accommodating the change in distance between the centering posts 32 on the divergent flap backs 36 and the divergent seal backs 38 of the divergent seals 14.

Figure 4:
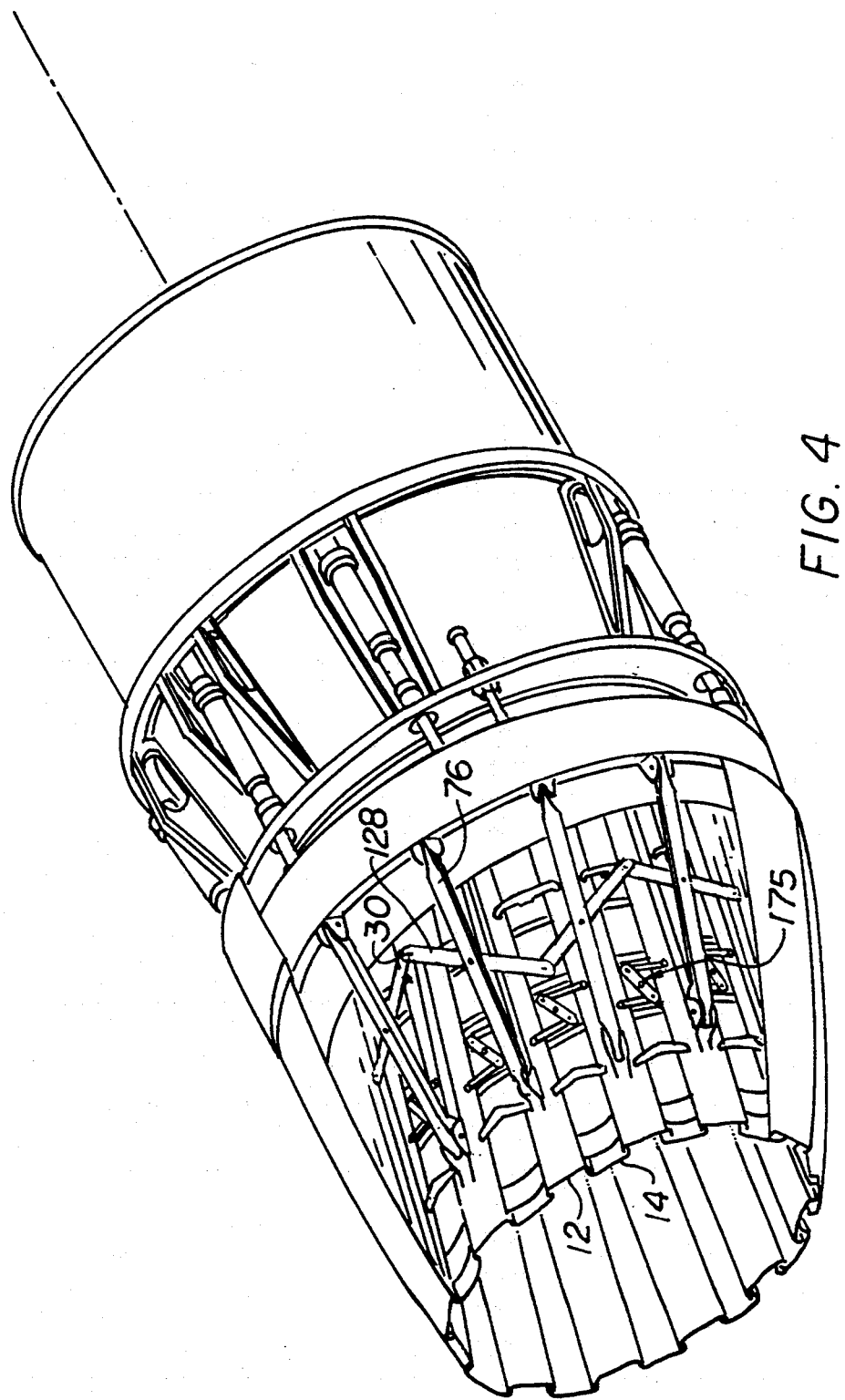
FIG. 4 is a perspective view of an axisymmetric vectoring exhaust nozzle having positioning apparatus in accordance with another alternative embodiment of the present invention wherein the centering levers are mounted to the compression links that vector the divergent flaps.

Yet another embodiment illustrated in FIG. 4 provides a ring of pivotably interlinked centering levers 128 on the compression links 76, used to vector the flaps. The centering levers 128 are pivotably linked together at their respective adjacent ends, preferably, by universal joints 30 such as ball joints illustrated in the FIGS. This equidistantly spaces the aft ends of the compression members and consequently the divergent flaps. A set of conventional bellcrank centering devices 175, such as those shown in U.S. Pat. No. 4,128,208, entitled "EXHAUST NOZZLE FLAP SEAL ARRANGEMENT" by Ryan et al, assigned to the present assignee, and herein incorporated by reference, are used to center the divergent seals 14 between the divergent flaps 12.

While the preferred embodiment of the invention has been described fully in order to explain its principles, it is understood that various modifications or alterations may be made to the preferred embodiment without departing from the scope of the invention as set forth in the appended claims.

I claim:

1. A positioning apparatus for centering adjacent longitudinally extending seals and flaps in an aircraft gas turbine engine exhaust nozzle, said positioning apparatus comprising:
   a plurality of flap centering levers rotatably mounted on backs of the flaps,
   a plurality of seal centering levers rotatably mounted on backs of the seals, and
   said flap centering levers pivotably connected to adjacent ones of said seal centering levers.

2. A positioning apparatus as claimed in claim 1 wherein said flap centering levers are pivotably connected to adjacent ones of said seal centering levers by universal joints connecting corresponding ends of said flap centering levers and said seal centering levers.

3. A positioning apparatus as claimed in claim 2 wherein said flap levers:
   are rotatable about a center-point,
   have arms extending from said center-point, and
   include a means for allowing said arms to rotate freely about an axis parallel to the flap.

4. A positioning apparatus as claimed in claim 3 wherein said means for allowing said arms to rotate freely about an axis parallel to the flap comprises a double hinge joint between said arms.

5. A positioning apparatus as claimed in claim 4 wherein said universal joints are uni-ball joints.

6. A positioning apparatus as claimed in claim 1 wherein one of said plurality of flap centering levers and said plurality of seal centering levers are operably mounted so as to allow said one of said plurality of said levers to radially translate along an axis generally normal to said backs.

7. A positioning apparatus as claimed in claim 6 wherein said one of said plurality of flap centering levers and said plurality of seal centering levers are mounted on slidable variable length posts and the other of said plurality of flap centering levers and said plurality of seal centering levers are mounted on fixed length posts.

8. A positioning apparatus for centering adjacent longitudinally extending seals and flaps in an aircraft gas turbine engine exhaust nozzle having actuation links for pivoting the flaps, said centering apparatus comprising:
   a plurality of flap centering levers rotatably mounted on the actuation links and about axis that are generally perpendicular to the links,
   each of said flap centering levers are rotatable about a center-point at which said lever is rotatable about said axis and have arms extending from said center-point,
   wherein said arms of adjacent ones of said flap centering levers are pivotably connected.

9. A positioning apparatus as claimed in claim 8 further comprising a seal centering means mounted on backs of the seals.

10. An axisymmetric vectoring exhaust nozzle having a flap and seal positioning means, said nozzle comprising:
    a plurality of circumferentially adjacent longitudinally extending seals and flaps,
    each of said flaps pivotably connected to a relatively fixed portion of the nozzle by a universal joint,
    a plurality of flap centering levers rotatably mounted on backs of said flaps,
    a plurality of seal centering levers rotatably mounted on backs of said seals, and
    said flap centering levers pivotably connected to adjacent ones of said seal centering levers.

11. A nozzle as claimed in claim 10 wherein said flap centering levers are pivotably connected to adjacent ones of said seal centering levers by universal joints connecting corresponding ends of said flap centering levers and said seal centering levers.

12. A nozzle apparatus as claimed in claim 11 wherein said flap levers:
are rotatable about a center-point,
have arms extending from said center-point, and
include a means for allowing said arms to rotate freely about an axis parallel to the flap.

13. A nozzle as claimed in claim 12 wherein said means for allowing said arms to rotate freely about an axis parallel to the flap comprises a double hinge joint between said arms.

14. A nozzle as claimed in claim 1 wherein one of said plurality of flap centering levers and said plurality of seal centering levers are operably mounted so as to allow said one of said plurality of said levers to radially translate along an axis generally normal to said backs.

15. A nozzle as claimed in claim 14 wherein said one of said plurality of flap centering levers and said plurality of seal centering levers are mounted on slidable variable length posts and the other of said plurality of flap centering levers and said plurality of seal centering levers are mounted on fixed length posts.

16. A nozzle as claimed in claim 15 wherein said slidable variable length posts comprise an inner piston disposed within a hollow cylinder.

17. A nozzle as claimed in claim 10 further comprising universal joints pivotably connecting said actuation links to the flaps and to a vectoring for vectoring said nozzle.

* * * * *